United States Patent Office.

SYLVESTRE FOREL, OF MULHOUSE, ALSACE, GERMANY.

OBTAINING OXYAZOIC COLORING-MATTER FROM TETRAZO DIPHENYL AND DITOLYL.

SPECIFICATION forming part of Letters Patent No. 386,192, dated July 17, 1888.

Application filed November 29, 1887. Serial No. 256,424. (Specimens.) Patented in France October 20, 1887, No. 186,430, and in England November 11, 1887, No. 15,459.

*To all whom it may concern:*

Be it known that I, SYLVESTRE FOREL, a citizen of Switzerland, resident at Mulhouse, Alsace, Germany, have invented new and useful Improvements in Coloring-Matters, (for which I have obtained Letters Patent of Great Britain, No. 15,459, dated November 11, 1887; France, No. 186,430, dated October 20, 1887,) of which the following is a specification.

While a great deal of somewhat complicated azoic coloring-matters deriving from diphenyl and ditolyl have been patented, the most simple representatives of this class are mentioned neither in patents nor in scientific papers. I discovered that some of these most simple derivatives—viz., the oxyazoic compounds resulting from the action of tetrazo-diphenyl and tetrazo-ditolyl on phenol and orthocresylol—enjoy interesting coloring properties and are proper for a considerable technical use, because they are able to dye vegetable fibers without any mordant, and to communicate to them a bright-yellow color.

My invention consists, therefore, in manufacturing and applying, for purposes of dyeing, benzidine-azo-ortho-cresylol, $$\begin{matrix} C_6H_4N=NC_6H_3(CH_3)(OH) \\ \updownarrow \\ C_6H_4N=NC_6H_3(CH_3)(OH) \end{matrix}$$

tolidine-azo-phenol, $$\begin{matrix} C_6H_3(CH_3)N=NC_6H_4(OH) \\ \updownarrow \\ C_6H_3(CH_3)N=NC_6H_4(OH) \end{matrix}$$

tolidine-azo ortho-cresylol, $$\begin{matrix} C_6H_3(CH_3)N=NC_6H_3(CH_3)(OH) \\ \updownarrow \\ C_6H_3(CH_3)N=NC_6H_3(CH_3)(OH) \end{matrix}$$

For the manufacturing of the dye-stuffs I use the following method: Twenty-eight kilograms, 2 of dry sulphate of benzidine, or fifty-six kilograms, 4 of the same in the form of a paste of fifty per cent., or twenty-five kilograms, 7 of chlorahydrate of benzidine, or thirty-one kilograms of nitrate of benzidine were mixed with 4–500 liters of water and twenty-four kilograms of hydrochloric acid of 30° Tweddle, and in the well-cooled mixture fourteen kilograms of nitrite of soda are added in. I by this way get a solution of chloride of tetrazo-diphenyl, which is poured in a well-cooled solution of twenty-one kilograms, 6 of ortho-cresylol, ninety kilograms of caustic soda of 72° Tweddle, and 6–700 liters of water.

After some hours the coloring-matter is filtered and well washed with water. It is in this state insoluble in water, but easily soluble in diluted alkali. The alkaline solution can be directly used for dyeing, and yields on cotton a bright-yellow shade. In order to get a commercial product soluble in water, either dry or in form of a paste, the following way is adopted: I dissolve the precipitate in rather diluted alkali—say twenty-four kilograms of caustic soda of 72° Tweddle and 50–100 liters of water, according to the state of dryness of the precipitate—and I pour this solution in a concentrated solution of common salt. The disodic salt of the oxyazoic compound is precipitated in form of a brown paste, which is quite completely soluble in water.

The paste is filtered and mixed when still wet with 10–15 kilograms of soda-ash. By this means the substance becomes completely soluble in hot water. It is ready for sale in the form of a paste. If I want to get a powder, I allow it to dry at a low temperature, (say 5° centigrade). If, finally, in the two above operations thirty-one kilograms of tolidine are substituted for the twenty-eight kilograms, 2 of benzidine, we get the corresponding derivatives of ditolyl.

In the four cases the reaction is the same. I give for example the chemical equations for the action of the chloride of tetrazo-diphenyl on phenol:

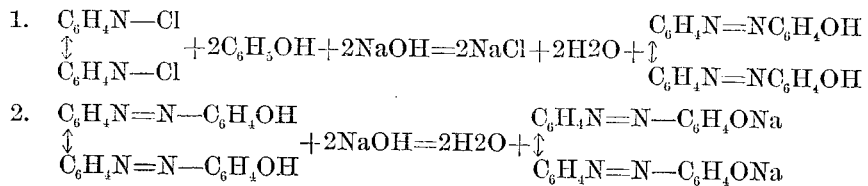

The concentration and the proportion of the alkali can also be somewhat changed. If, viz., the proportion of alkali used for the dissolution of the phenol or cresylol is a larger one, I obtain directly a soluble compound, the sodic salt of the oxyazoic body, which may be precipitated by common salt.

The dye-stuffs prepared by this way yield on vegetable fibers a bright yellow when applied on a bath containing alkali or soap. The best temperature for dyeing is between 60° and 100° centigrade.

The shade of cotton when got out of the dyeing-bath is orange. By washing with water or dilute acid and drying it turns up into yellow. By washing and scouring the coloring-matter is not at all washed away. The shades resist quite well soap, dilute acids, and sunlight.

The salts of the alkaline earth (lime) yield with these coloring-matters sparingly soluble salts. It is therefore necessary to use for dyeing pure (distilled) water, or if no pure water is at hand to correct the hard water with caustic soda or soda-ash. The dyeing-bath is not at once exhausted. It may be reserved for the following operations, and strengthened, if it be necessary, by addition of further quantities of dye-stuff.

Having thus described my invention and the manner of employing the same, what I claim, and wish to secure by Letters Patent of the United States of America, is—

1. The process of manufacturing oxyazoic compounds from tetrazo-diphenyl and tetrazo-ditolyl by the action of tetrazo-ditolyl on phenol, or of tetrazo-diphenyl and tetrazo-ditolyl on phenol and orthocresylol in alkaline solution, substantially as herein described.

2. A coloring-matter having the properties of yielding on vegetable fiber bright yellow when applied on a bath containing alkali or soap, the shade of the fiber when leaving the dyeing-bath being orange, but after washing with water or diluted acid and drying turning up into yellow, the salts resulting by the combination thereof with the salts of the alkaline earths being hardly soluble in water.

In testimony whereof I have signed my name to this specification in the presence of two subscribing witnesses.

SYLVESTRE FOREL.

Witnesses:
G. WEGELIN, Fils,
G. KLEINHER.